M. C. MEIGS.
Reflector.
No. 231,601. Patented Aug. 24, 1880.
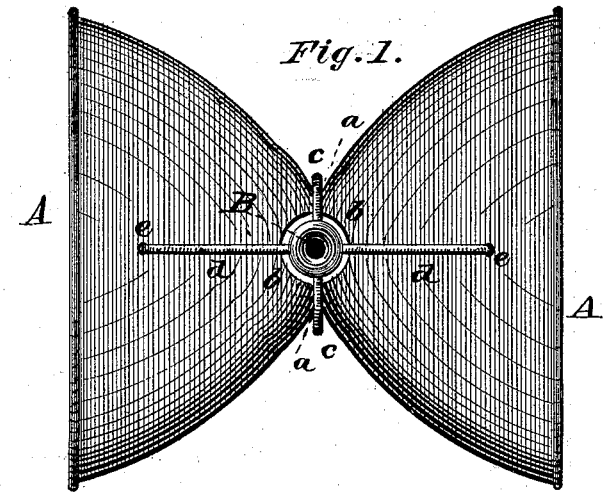
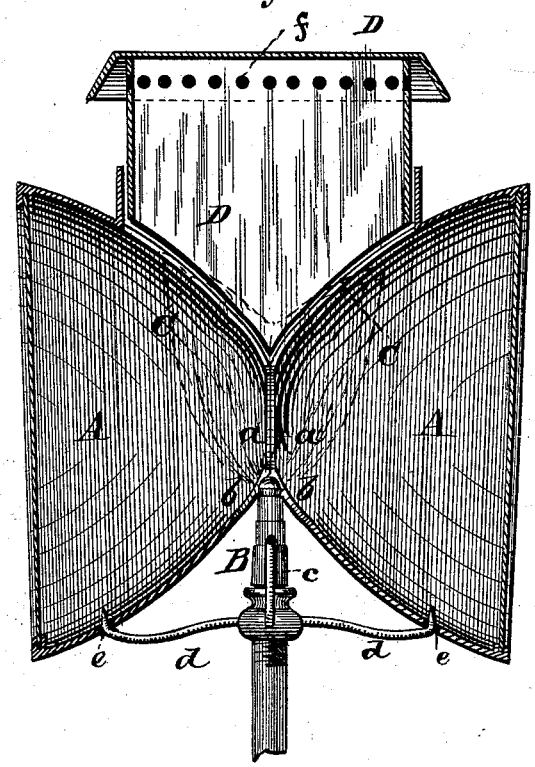
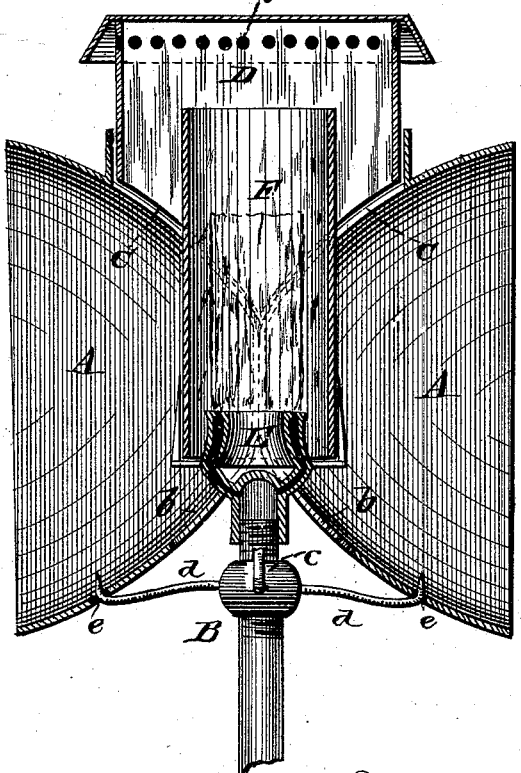
Witnesses:
P. C. Dietrich
Jno. H. Stockman
Inventor
Montgomery C. Meigs
Per C. N. Watson & Co. Attorneys

UNITED STATES PATENT OFFICE.

MONTGOMERY C. MEIGS, OF WASHINGTON, DISTRICT OF COLUMBIA.

REFLECTOR.

SPECIFICATION forming part of Letters Patent No. 231,601, dated August 24, 1880.

Application filed January 2, 1880.

*To all whom it may concern:*

Be it known that I, MONTGOMERY C. MEIGS, of Washington, in the District of Columbia, have invented certain new and useful Improvements in Reflectors, (Case B;) and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement on reflectors shown in my Patents Nos. 209,178 and 209,576, having for its object to so construct and arrange the same as to apply it to street lights and lamps; and it consists in the construction and arrangement of parts, as will be hereinafter more fully set forth, and pointed out by the claims.

In the annexed drawings, which fully illustrate my invention, Figure 1 is a bottom-plan view. Fig. 2 is a central vertical section, and Fig. 3 is a similar section as applied to an Argand burner.

A A represent the reflectors, which may be of the form shown in the patents above named and of any desired size. The bottoms of these reflectors are cut out, and they are joined together by soldering or any other suitable means, as shown at *a*.

In street-lamps the large ends of the reflectors will be provided with suitable glasses. At the juncture of the two reflectors is made an opening, *b*, so arranged as to receive the point of a burner, B, on which the reflectors are supported by means of the upwardly-extending spring-arms *c* and the laterally-extending arms *d*, secured to the base of said burner. The ends of the lateral arms *d* are bent upward and enter openings *e* in the sides of the reflectors.

In the upper portion of the reflectors and above the burner is formed a slot, C, extending lengthwise of the same, through which slot the flame passes.

D represents the top, which is placed on the reflectors over the slot C, said top being adapted to conform to the shape of the reflectors and fit tightly thereon, and provided with suitable openings *f* for ventilation.

I have described the reflector as applied to a street-lamp; but it may be used for various other purposes.

The glasses at the large ends of the reflectors may be dispensed with, the openings *b* C enlarged, and an Argand burner with a glass chimney, E F, substituted, as shown at Fig. 3. By this arrangement the light is collected in two beams horizontally, and is thrown in directly opposite directions along the pavement or sidewalk, &c. The light will be much stronger than that obtained from lamps in present use, as the whole or nearly the whole of the light will be utilized.

The device is simply and economically constructed, and is not liable to get out of repair.

Having thus fully described my invention, what I claim as new, and desire to secure by Letters Patent, is—

1. The reflectors A A, joined together, as shown, provided with lateral arms *d* and openings *b*, C, and *e*, in combination with the burner B and top D, the latter having openings *f*, substantially as and for the purpose set forth.

2. The reflectors A A, joined together, as shown, and provided with openings *b* C, spring-arms *c*, and lateral arms *d*, in combination with the burner B and top D, the latter having openings *f*, substantially as and for the purpose set forth.

In testimony that I claim the foregoing as my own I have hereto affixed my signature in presence of two witnesses.

MONTGOMERY C. MEIGS.

Witnesses:
WM. B. UPPERMAN,
N. CALLAN.